(12) United States Patent
Jordan (10) Patent No.: US 8,339,110 B2
(45) Date of Patent: Dec. 25, 2012

(54) SINGLE STAGE HYBRID CHARGE PUMP

(75) Inventor: James D. Jordan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 439 days.

(21) Appl. No.: 12/754,424

(22) Filed: Apr. 5, 2010

(65) Prior Publication Data

US 2011/0241629 A1    Oct. 6, 2011

(51) Int. Cl.
*H02J 7/00* (2006.01)
*H02H 7/122* (2006.01)
*H02M 3/18* (2006.01)

(52) U.S. Cl. ........ 320/166; 320/101; 320/167; 307/109; 307/125; 307/126; 363/59; 363/60; 363/21.02

(58) Field of Classification Search .................... 320/166
See application file for complete search history.

(56) References Cited

U.S. PATENT DOCUMENTS

| | | | |
|---|---|---|---|
| 5,672,952 A | 9/1997 | Szepesi | |
| 6,034,508 A | 3/2000 | Chang | |
| 6,118,678 A * | 9/2000 | Limpaecher et al. | 363/60 |
| 6,160,374 A | 12/2000 | Hayes et al. | |
| 6,341,076 B1 * | 1/2002 | Kadatskyy et al. | 363/56.12 |
| 6,487,093 B1 * | 11/2002 | Vogman | 363/21.02 |
| 7,327,119 B2 | 2/2008 | Stephenson, III | |
| 7,345,454 B2 * | 3/2008 | Thrap | 320/135 |
| 7,391,184 B2 | 6/2008 | Luo et al. | |
| 7,471,061 B2 | 12/2008 | Shah et al. | |
| 2003/0141944 A1 * | 7/2003 | Daniels et al. | 333/181 |
| 2008/0278978 A1 * | 11/2008 | Czimmek | 363/60 |
| 2009/0015211 A1 | 1/2009 | Ribellino et al. | |
| 2009/0195214 A1 * | 8/2009 | Gehrke et al. | 320/137 |

FOREIGN PATENT DOCUMENTS

| | | |
|---|---|---|
| WO | 9320610 | 10/1993 |
| WO | 2008016571 A1 | 2/2008 |

* cited by examiner

*Primary Examiner* — Yalkew Fantu
(74) *Attorney, Agent, or Firm* — Kunzler Law Group, PC (57) ABSTRACT

An apparatus, system, and method are disclosed for a single stage hybrid charge pump. A switch module is connected to ground. An inductance module is connected between a DC voltage source and the switch module. A first capacitance module is connected to the switch and to the inductance module. A first current blocking module is connected between the DC voltage source the first capacitance module. A second capacitance module is connected to ground. A second current blocking module is connected to a node between the first capacitance module and the first current blocking module and is also connected to the second current blocking module. The switch module is operated to switch between an open state and a closed state thereby causing a voltage across the second current blocking module to increase until it is limited by a voltage limiting module.

20 Claims, 6 Drawing Sheets

SINGLE STAGE HYBRID CHARGE PUMP

FIELD

The subject matter disclosed herein relates to power supplies and more particularly relates to power supplies that generate a capacitor charge that is greater than two times a DC source voltage.

BACKGROUND

Description of the Related Art

A power supply, sometimes known as a power supply unit or PSU, is a device or system that supplies electrical or other types of energy to an output load or group of loads. A power supply, in some embodiments may be configured to convert power in one form to another form, such as converting AC power to DC power. The regulation of power supplies is typically done by incorporating circuitry to tightly control the output voltage or current of the power supply to a specific value. The specific value is closely maintained despite variations in the load presented to the power supply's output, or any reasonable voltage variation at the power supply's input.

For example, in an electronic device such as a computer, the power supply is typically designed to convert an AC voltage input such as is traditionally provided by a conventional wall socket, into several low-voltage DC power outputs for transmission to the internal components of the computer. Conversion is sometimes performed in stages that may include different power supply topologies such as a rectification stage, a boost stage, buck stage, or other topology.

Often when a power supply is unable to supply power to a load, it is desirable to have energy stored to provide enough power to save critical data, execute commands, etc. The amount of time between when power from a source is lost, a power supply fails, etc. and when no more power can be supplied to a load is sometimes called holdup time. Holdup time is often provided using one or more capacitors with stored energy that supply energy until a voltage of the capacitor drops below an acceptable level. If initial voltage of a capacitor used for holdup time is raised, energy in the capacitor is raised.

A circuit that can increase a charge stored in a capacitor is particularly useful, because the energy stored in a capacitor is defined by the equation: $E=0.5 \; CV^2$ (Energy=0.5*Capacitance*Voltage*Voltage). Thus, a large amount of energy can be stored in a capacitor by increasing the voltage only slightly even when the capacitance of the capacitor is relatively small. This means that for a given holdup requirement, as voltage across the capacitor is raised, the capacitor may be made smaller to provide the same holdup time.

BRIEF SUMMARY

From the foregoing discussion, it should be apparent that a need exists for an apparatus, system, and method that efficiently store energy in a capacitor at a voltage that is greater than a source voltage using relatively few low-cost, small, inexpensive components. Beneficially, such an apparatus, system, and method would allow the capacitor voltage to quickly reach a voltage higher than the source voltage, for example to around two times the voltage source, and then continue to slowly pump charge into the capacitor via an inductance path until a desired voltage is reached.

The present invention has been developed in response to the present state of the art, and in particular, in response to the problems and needs in the art that have not yet been fully solved by currently available power supply circuits. Accordingly, the present invention has been developed to provide an apparatus, system, and method for storing energy as charge across a capacitor that overcome many or all of the above-discussed shortcomings in the art.

The apparatus to store energy is provided with a plurality of modules configured to functionally execute the necessary steps of generating a voltage across a storage capacitance. These modules in the described embodiments include a switch module, an inductance module, a first capacitance module, a first current blocking module, a second capacitance module, a second current blocking module, and a voltage limiting module.

In one embodiment, the switch module is connected to ground, and the switch module includes an open state and a closed state. The inductance module is connected between a DC voltage source and the switch module. The first capacitance module is connected to the switch and to the inductance module.

The first current blocking module is connected between the DC voltage source the first capacitance module The first current blocking module allow current to flow from the DC voltage source toward the first capacitance module and prevents current from flowing through the first current blocking module to the DC voltage source. The second capacitance module is connected to ground. The second current blocking module is connected to a node between the first capacitance module and the first current blocking module and is also connected to the second current blocking module. The second current blocking allows current to flow to the second capacitance module in a first direction and prevents current from flowing through the second current blocking module in a direction opposite the first direction. The voltage limiting module limits voltage across the second capacitance module to a predefined limiting voltage that is higher than a voltage of the DC voltage source.

When the switch module is in the closed state, current flows through the inductance module in a direction from the DC voltage source toward the switching module, and current flows through the first current blocking module to store energy in the first capacitance module. When the switch is in the open state, current in the inductance module flows through the first capacitance module, and from the first capacitance module through the second current blocking module to charge the second capacitance module.

In another embodiment of the apparatus, the apparatus includes a switch connected to ground. The switch includes an open state and a closed state. The apparatus also includes an inductor and a resistor connected in series between a DC voltage source and the switch. A first capacitor is connected to the switch. A first diode is connected between the DC voltage source and the first capacitor such that the first diode and first capacitor are in series. The first diode allows current to flow from the DC voltage source toward the first capacitor and prevents current from flowing through the first diode to the DC voltage source. A second capacitor is connected to ground. A zener diode is configured in parallel with the second capacitor and limits voltage across the second capacitor to a voltage higher than the voltage of the DC voltage source.

When the switch is in the closed state, current flows through the inductor in a direction from the DC voltage source toward the switch, and current flows through the first diode to store energy in the first capacitor. When the switch module is in the open state, current in the inductor flows to the first capacitor, and from the first capacitor through the second diode to the second capacitor.

A system of the present invention is also presented to store energy. The system may be embodied using the embodiments described above with the regard to the apparatus. In particular, the system, in one embodiment, includes a power supply and an energy storage apparatus. The power supply is typically configured to provide power to one or more electronic devices. The energy storage apparatus is coupled to the power supply and includes the switch module, inductance module, first capacitance module, first current blocking module, second current blocking module, and voltage limiting module as described above.

Similarly, when the switch module is in the closed state, current flows through the inductance module in a direction from the DC voltage source toward the switching module, and current flows through the first current blocking module to store energy in the first capacitance module. When the switch is in the open state, current in the inductor flows to the first capacitor, and from the first capacitor through the second diode to the second capacitor.

The system may further include an electronic device coupled to the power supply and energy storage apparatus such that the energy storage apparatus is configured to provide stored energy to the electronic device.

A method of the present invention is also presented for storing energy in accordance with the apparatus and system described above. The method in the disclosed embodiments substantially includes the steps necessary to carry out the functions presented above with respect to the operation of the described apparatus and system. In one embodiment, the method includes providing a control signal to a switch module. In a further embodiment, the method includes operating the switch module to increase a charge stored in a storage capacitance module. The method may also include operating a voltage limiting module to limit the voltage of the storage capacitance module. The method may also include providing energy stored in the storage capacitance module to an electronic device in response to a voltage drop below a predefined threshold in a power supply path to the electronic device.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments of the invention may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
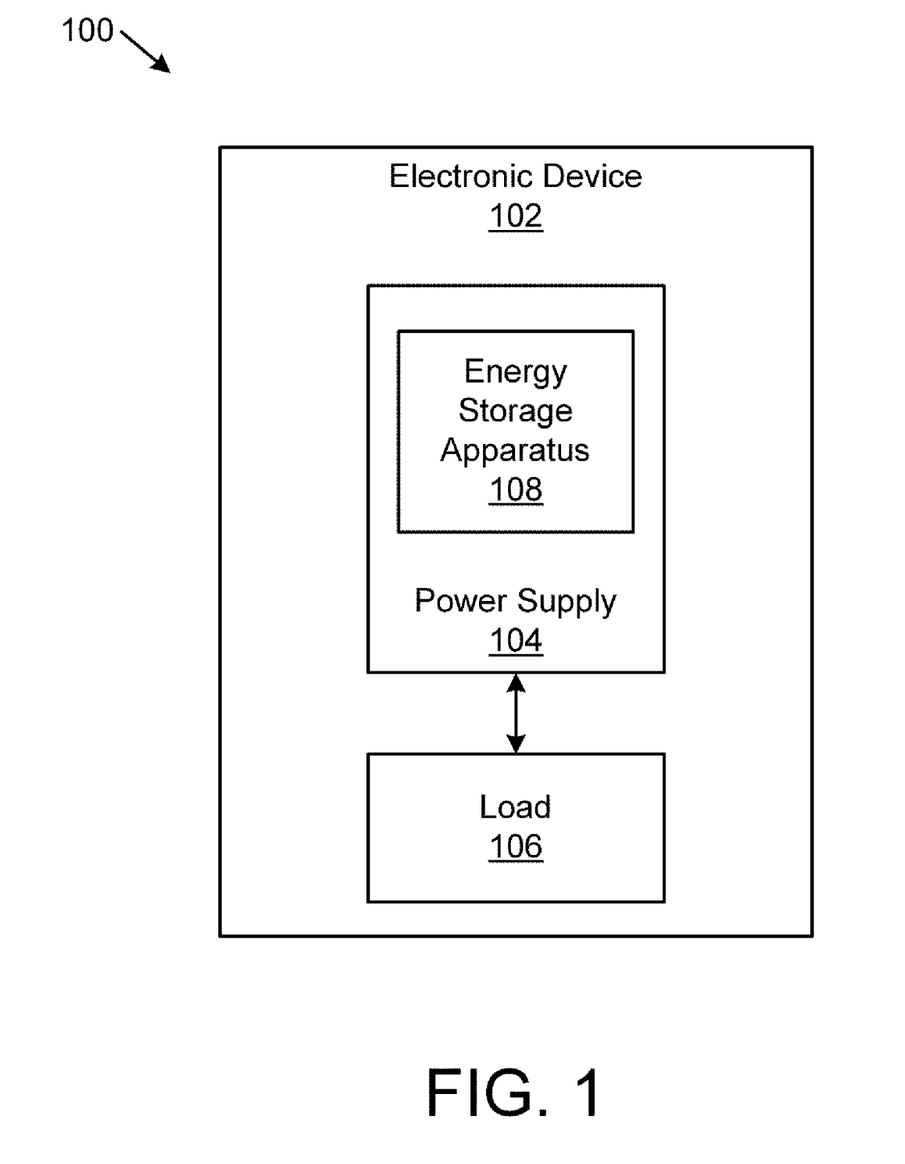
FIG. 1 is a schematic block diagram illustrating one embodiment of a system for storing energy in accordance with the present invention.

FIG. 1 is a schematic block diagram illustrating one embodiment of a system 100 for storing energy in accordance with the present invention. The system 100 includes an electronic device 102, a power supply 104, and a load 106.

In one embodiment, the power supply 104 provides regulated power to the electronic device 102 in order to power various electronic systems and subsystems within the electronic device 102. The power supply 104 is typically connected to the electronic device 102 by a cable, circuit board, or the like. The power supply 104 may be configured to provide one or more different voltages and currents to the electronic device 102. For example, in a typical computer power supply, voltages of +12 V, +5 V, +3.3 V, and −12 V are commonly provided.

The power supply 104 may include different functionalities and topologies. As will be recognized by those of skill in the art, typical topologies may include rectification, boost, buck, or other topologies necessary to regulate and provide power to the electronic device 102. The power supply 104 may include various stages that combine one or more of these topologies in order provide one or more desired output voltages to the electronic device 102. The various stages of the power supply 104 allow the power supply 102 or stages within the power supply 102 to perform different functions such as rectification, voltage or current conversion, frequency changing, inversion, etc.

In various embodiments, the electronic device 102 may be a computer system, such as a desktop, laptop, or server, and the power supply 104 may be configured to provide power to the various components of the computer system. In other embodiments, the electronic device 102 may include devices such as routers, switches, personal digital assistants ("PDAs"), displays, appliances or other electronic devices as recognized by one of skill in the art. In one embodiment, the power supply 104 may be implemented within the same enclosure as the electronic device 102, such as within a computer tower case. In other embodiments, the power supply 104 may be implemented external to the electronic device 102 and may be connected to the electronic device 102 via a connection means such as a cord, cable, or bus such as in a blade center.

The electronic device 102 causes a load 106 to be applied to the power supply 104. The amount of load 106 may affect the performance of the power supply 104. The power supply 104 is configured to operate efficiently in conjunction with a specified load 106. In one embodiment, the load 106 may vary depending on the operation characteristics of the electronic device 102 and the power supply 104 may be configured to adjust accordingly. For example, the power supply 104 may include a feedback signal for adjusting the power output characteristics of the power supply 104 in response to changes in the load 106. Typically, the power supply 104 regulates the voltage on a regulated bus so as to provide substantially constant voltage levels to the electronic device 102 under varying load conditions.

In some circumstances, the electronic device 102 or a component of an electronic device 102 may experience a loss of power supplying the electronic device 102 in a power path to the electronic device 102. For example, the power supply 104 may be providing a 12 V signal to a hard-disk drive ("HDD"), and the 12 V signal may fall below an acceptable threshold or even to zero. In another embodiment, the power supply 104 may fail. In such a case, the energy storage apparatus 108 stores sufficient energy in a capacitance module to temporarily provide power to the HDD.

The energy storage apparatus 108 charges a capacitance module to a voltage above the voltage supplied by the power supply 104 to provide energy to the electronic device 102 in case of a power loss. In one embodiment, the energy storage apparatus 108 includes hybrid circuitry that utilizes the fast charging characteristics of a single-stage charge pump with the slow charge characteristics of a boost converter to store energy in the capacitance module that can be delivered on demand to the electronic device 102 or to a component of the electronic device 102. The energy storage apparatus 108 permits fast source voltage doubling as with a conventional charge pump, but also allows for voltage charging above standard typical charging voltage of less than or equal to two times a source voltage. Thus, if the source voltage is 12 V, then the energy storage apparatus 108 is capable of generating greater than 24 V in the capacitance module thereby achieving higher levels of energy storage over time and greater charge storage capacity in small component such as a small capacitor.

Figure 2:
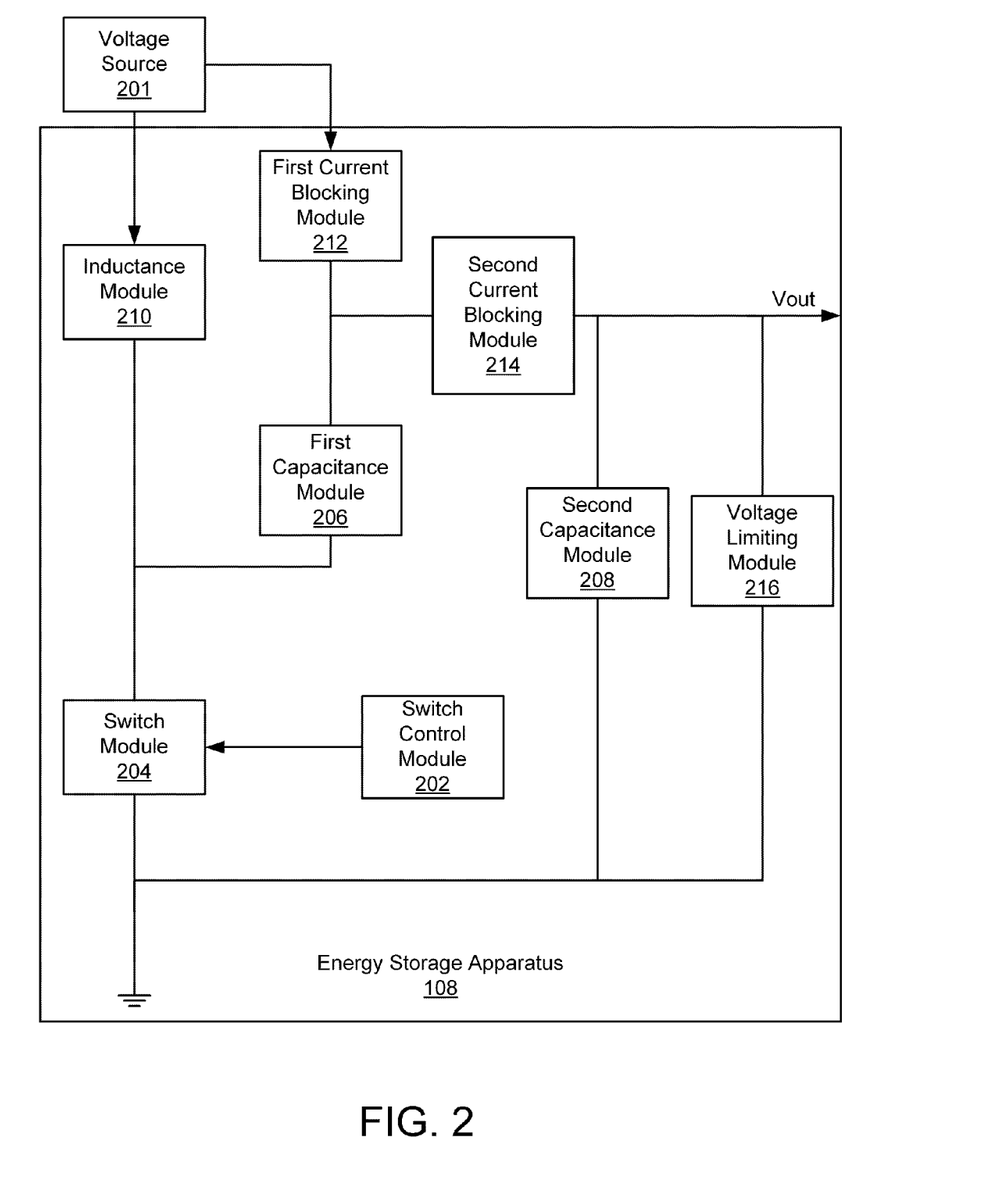
FIG. 2 is a schematic block diagram illustrating one embodiment of an apparatus for storing energy in accordance with the present invention.

FIG. 2 is a schematic block diagram illustrating one embodiment of an apparatus for storing energy 108 in accordance with the present invention. As depicted, the energy storage apparatus 108 includes a switch control module 202, a switch module, a first capacitance module, a second capacitance module 208, an inductance module 210, a first current blocking module 212, a second current blocking module 214, and a voltage limiting module 216.

The energy storage apparatus 108, in one embodiment, includes a parallel low energy capacity inductance module 210 that is in parallel with a first capacitance module 206 when charging the first capacitance module 206, but in series with the first capacitance module 206 when discharging energy through the first capacitance module 206 to a second storage capacitance module 208. Because the parallel first inductance module 210 consumes power during a charging cycle of the parallel first capacitance module 206, efficiency may be increased by minimizing the charge cycle to discharge cycle ratio. This is controlled by operating a switching module 204 according to a selected duty cycle, where the switching module 204 alternates putting the first capacitance module 206 in parallel with the inductance module 210 (charging) and then in series with the inductance module 210 (discharging). A DC power source 201 (e.g. 12 V) is used to charge the first capacitance module 206 and to store small amounts of energy in the inductance module 210 during the charging cycle.

The energy that is discharged into the second storage capacitance module 208 very quickly charges the second capacitance module 208 to almost twice the DC source voltage 201. (See FIG. 6 and discussion below). When the first capacitance module 206 is being charged, the inductance module 210 is also being charged with a small amount of energy. Instead of switching a negative node of the capacitance module to connect to the positive DC voltage source 201 during discharge as with conventional charge pumps, the negative node of the capacitance module 206 is connected in series with the inductance module 210. The inductive path is then used to dump energy from the first capacitance module 206 to the second capacitance module 208 for storage by way of a current blocking module 214. The energy in the inductance module 210 produces a voltage necessary to drive conduction through the first capacitance module 206 into the second capacitance module 208.

By alternating charging cycles according to a predefined duty cycle, the inductance energy will continue to build a voltage across the second capacitance module 208 thereby storing energy according to the equation: $E=0.5 \, CV^2$ (Energy=0.5*Capacitance*Voltage*Voltage). The voltage will continue to build until some form of bleed current or other mechanism such as the voltage limiting module 216 is used to release energy from the second capacitance module 208. In this manner, a significant amount of energy can be stored in a relatively small capacitance component as defined by the equation above.

The energy storage apparatus 108 in the depicted embodiment receives power from a voltage source 201 that provides a DC voltage (e.g. 12 V) to the energy storage apparatus 108. The energy storage apparatus 108, in one embodiment, includes a switch control module 202, a switch module 204, a first capacitance module 206, a second capacitance module 208, an inductance module 210, a first current blocking module 212, a second current blocking module 214, and a voltage limiting module 216.

In the depicted embodiment, the switch module 204 is connected to ground and the switch module 204 has an open state and a closed state. When the switch module 204 is in the closed state, the switch module connects the first capacitance module 206 and inductance module 210 to ground. When the switch module 204 is in the open state, the switch module 204 acts as an open circuit causing the first capacitance module 206 to be in series with the inductance module 210. Typically, the switch module 204 is or includes a logic switch such as a transistor or logic gate that is operable by way of a control signal. Other types of switches as recognized by those of skill in the art may also be used. As discussed in detail below, the switch control module 202 provides a control signal to the switch module 204 to control operation of the switch module 204 between the closed state and the open state.

The first capacitance module 206 in the depicted embodiment is connected to the switch module 204 and to the inductance module 210. The first capacitance module 206 is configured, in one embodiment, as a single capacitor, but it is contemplated that other configurations and devices that have a capacitance may be used. The first capacitance module 206 has the ability to hold an electrical charge. For example, the first capacitance module 206 may be charged to a particular voltage by way of the voltage source 201 and will temporarily store energy until the energy is passed to the second capacitance module 208. The second capacitance module 208 is connected to ground and may be configured as a single capacitor that is capable of storing energy in the form of a charge. In other embodiments, the capacitance module 208 may include two or more capacitors and may include other components, such as a resistor. The second capacitance module 208 receives and stores a charge through the second current blocking module 214 until the stored energy is released to the electronic device 102 by way of an output node Vout.

The inductance module 210 is connected between the DC voltage source 201 and the switch module 204. Thus, a current path is provided from the voltage source 201 through the inductance module 210 and then to ground through the switch module 204 when the switch module 204 is in a closed state. The inductance module 210, in one embodiment, includes an inductor or other element with an inductance such as a transformer, part of a transformer, or other component with characteristics of an inductor as recognized by those of skill in the art. In one embodiment, the inductance module 210 may include a resistor. The resistor may be configured in series with an inductor component and may be used to limit an amount of current that passes through the inductance module

210. In some embodiments, an inherent resistance may be provided by the inductor component or by the current path. The resistance also provides current limit protection in the event that the switch module 204 experiences a short circuit and ensures that the saturation current of the inductance module 210 is not exceeded.

Together, the inductance value of the inductance module 210 and the resistance value define an L/R time constant that determines the current flow properties of the inductance module 210. For example if the inductance value is 100 uH and the resistance value is 200 ohms, then an L/R time constant of 0.5 uS is defined. The L/R time constant is the amount of time required for the current through the inductor module 210 to increase to 63.2 percent of the maximum current. Assuming that the DC voltage source is 12 V, then the current through the inductance module 210 would reach a steady state current of about 60 mA after the passage of several time constants. By passing current through the inductance module 210, small amounts of energy are stored therein that can be passed to the first and second capacitance modules 206, 208 when the switch module 204 enters an open state. The closed state of the switch module 204 and the inductance and resistance of the inductance module 210 may be optimized to minimize power loss to ground, inductor size, resistor size, etc.

A first current blocking module 212 is connected between the DC voltage source 201 and the first capacitance module 206. A second current blocking module 214 is connected to a node between the first capacitance module 206 and the first current blocking module 212 and is connected to the second capacitance module 208. In one embodiment, the first and second current blocking modules 212, 214 are each configured as a single diode. However, it is contemplated that each could be implemented as one of a diode, a transistor configured as a diode, a switch, or other device capable of limiting current flow to a single direction of flow.

In one embodiment, the first current blocking module 212 allows current to flow from the DC voltage source 201 toward the first capacitance module 206 and prevents current from flowing through the first current blocking module 212 back to the voltage source 201. This enables a voltage to be generated across the first capacitance module 206 without the charge leaking back towards the voltage source 201. Thus, the charge can be discharged to the second capacitance module 208 through the second current blocking module 214.

The second current blocking module 214, in one embodiment, allows current to flow to the second capacitance module 208 in a first direction and prevents current from flowing through the second current blocking module 208 in a direction opposite the first direction. This enables the second capacitance module 208 to be charged over time to voltages greater than the voltage of the voltage source 201 and even greater than two times the voltage of the voltage source 201 without a significant amount of charge leaking back towards the first capacitance module 206. The charge is stored in the second capacitance module 208 until it released to the electronic device 102 or is bled off to maintain the voltage below a predefined maximum voltage associated with the second capacitance module.

The voltage limiting module 216 is configured to limit voltage across the second capacitance module 208 to a predefined limiting voltage that is higher than the voltage of the DC voltage source 201. In one embodiment, the voltage limiting module 216 may comprise a zener diode configured in parallel with the second capacitance module 208. A zener diode is a diode that permits current not only in the forward direction like a normal diode, but also in the reverse direction if the voltage is across it is larger than its defined breakdown voltage. Thus, a zener diode in parallel with the second capacitance module 208 enables the second capacitance module 208 to be charged to around the breakdown voltage associated with the zener diode, but once the breakdown voltage is reached, energy from the second capacitance module 208 leaks through the zener diode preventing the second capacitance module 208 from being charged above a desired level. In this manner, a smaller sized capacitor element can be used with the second capacitance module 208 to store a relatively large amount of energy without exceeding a maximum voltage rating of a capacitor element in the second capacitance module 208.

In a further embodiment, the voltage limiting module 216 may also include a bleed resistor that allows sufficient current to flow from the second capacitance module 208 to bleed charge from the second capacitance module 208 to maintain a voltage across the second capacitance module 208 below a predefined maximum voltage. If the bleed resistor is configured between the second capacitance module 208 and a load 106, then as the voltage across the second capacitance module 208 increases, if the voltage limiting module 216 fails, current through the bleed resistor will increase until it equals the energy that the inductance module 210 is able to transfer into the second capacitance module 208.

The bleed resistor may be sized so that in case of failure of the voltage limiting module 216, the charge voltage of the second capacitance module 208 will reach an equilibrium voltage that is typically low enough, such that the bleed resistor prevents a voltage across the second capacitance module 208 from reaching a voltage rating of the second capacitance module 208. In one embodiment, both the zener diode and the bleed resistor are used concurrently to prevent the second capacitance module 208 from exceeding its voltage rating.

In operation, the switch control module 202 sends a control signal to the switch module 204 to cause the switch module 204 to alternate between its open state and its closed state (e.g. opening and closing a switch). When the switch module 204 is in the closed state, current flows through the inductance module 210 in a direction from the voltage source 201 toward the switching module 210 through the closed switch module 204 to ground. Current also flows through the first current blocking module 212, the first capacitance module 206, through the switch module 204 to ground to store energy in the first capacitance module 206. This causes the voltage across the first capacitance module 206 to be charged to a voltage near the DC voltage of the voltage source 201 (e.g. the DC voltage minus the voltage drop across the first current blocking module 212 and the switch module 204). Simultaneously, the current passing through the inductance module 210 causes energy to be stored therein in the form of an electromagnetic field.

When the switch module 204 is switched to the open state, current in the inductance module 210 continues to flow in a direction that current was flowing in the closed state and flows through the first capacitance module 206 instead of through the switch module 204 to ground, and from the first capacitance module 206 through the second current blocking module 214 to the second capacitance module 208. Over time, as the switch module 204 alternates between an open and closed state, this causes a charge to continually build up across the second capacitance module 208. The charge continues to build until the voltage limiting module 216 operates to limit the voltage across the second capacitance module 208.

The signal from the switch control module 202 may be operated, in one embodiment, according to a predefined duty cycle. The term duty cycle refers to the amount of time that the switch module 204 is "open" versus the amount of time the switch 204 is "closed." In one embodiment, the duty cycle is selected so that operation of the switch module 202 according to the selected predefined duty cycle causes a voltage to be generated across the second capacitance module 208 that is greater than two times the DC source voltage from the voltage source 201.

In one embodiment, the duty cycle includes an off time or open time that is greater than six times an on-time or closed time of the duty cycle. By minimizing the on time (i.e. the closed state of the switch module 204), the energy storage apparatus 108 can be made more efficient. This is because the conduction time used to store energy in the inductance module 210 (providing a path from the voltage source 201 through the inductance module 210 to ground) is minimized.

In a further embodiment, an off time of the duty cycle is less than a single time constant associated with the first capacitance module 206 such that after an initial charge cycle, a voltage is maintained across the first capacitance module 206. Thus, where the time constant associated with the first capacitance module 206 and resistive portion of the inductance module 210 defines the amount of time it takes for energy to be discharged from the first capacitance module 206, the off time of the duty cycle, which corresponds to a discharge time of the first capacitance module 206, is less than the time constant of the first capacitance module 206. Therefore the voltage across the first capacitance module 206 does not return to zero, during each switching period which minimizes components stresses associated with switching the states of the switching module 204.

In one embodiment, the switch control module 202 provides a pulse-width modulated signal to the switch module 204 to control the open/close cycle of the switch module 204. It is contemplated that in some embodiments, a feedback signal may be provided to the switch control module 202 to regulate the open/close operation of the switch module 204. Pulse-width modulation may be used, in some embodiments, to regulate the voltage across the second capacitance module 208.

Figure 3:
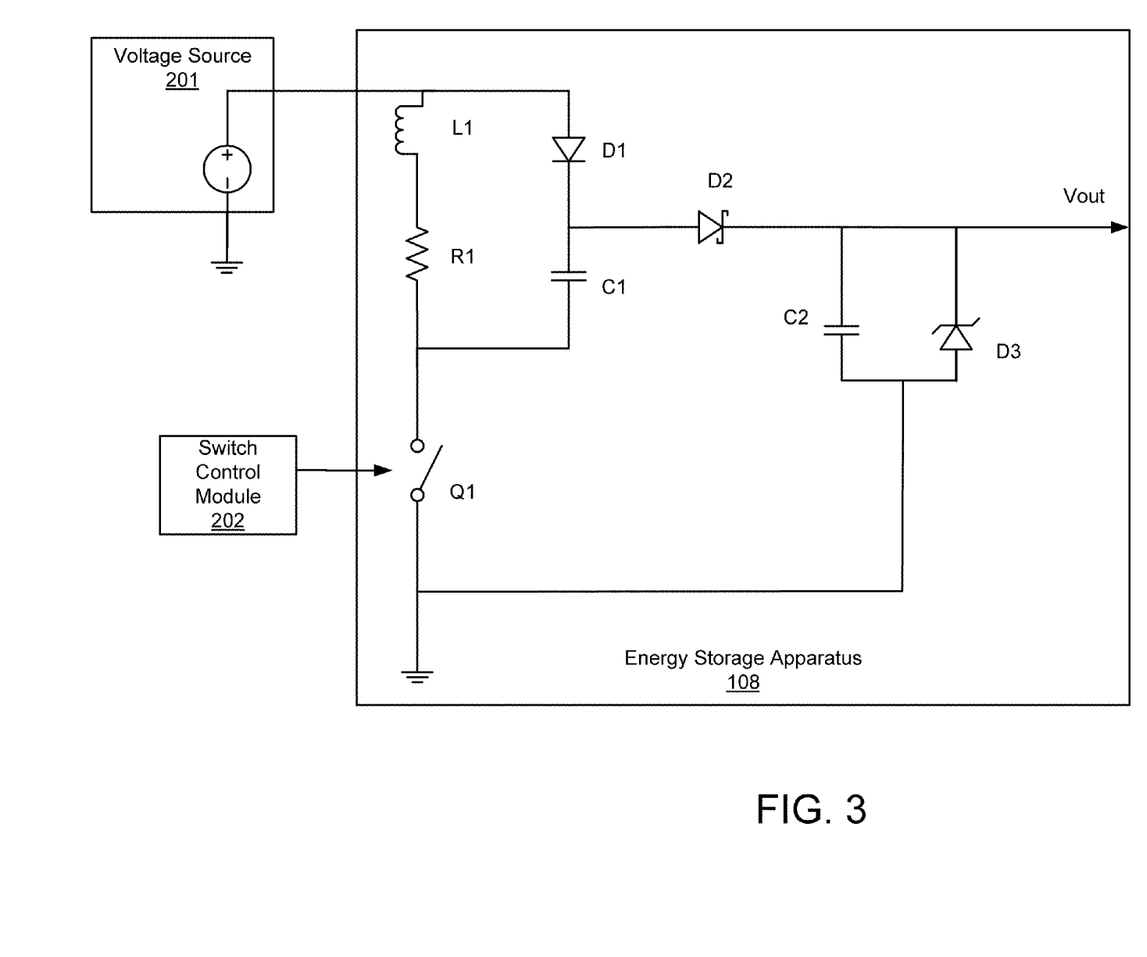
FIG. 3 is a schematic block diagram illustrating another embodiment of an apparatus for storing energy in accordance with the present invention.

FIG. 3 is a schematic block diagram illustrating a specific embodiment of an apparatus 108 for storing energy in accordance with the present invention. In the depicted embodiment, the switch module 204, first capacitance module 206, second capacitance module 208, inductance module 210, first current blocking module 212, second current blocking module 214 are implemented with specific circuitry components. Of course, in other embodiments different components may be used to perform the functions described above with regard to the modules 204-216.

The depicted embodiment includes a switch Q1 connected to ground, where the switch Q1 can be configured in an open and a closed state in response to a signal from the switch control module 202. An inductor L1 is connected in series with a resistor R1 between the D1 voltage source 201 and the switch Q1. A first capacitor C1 is also connected to the switch Q1 and the resistor R1. A first diode D1 is connected between the voltage source 201 and the first capacitor C1 such that the first diode D1 and first capacitor C1 are in series. The first diode D1 allows current to flow from the voltage source 201 toward the first capacitor C1 and prevents current from flowing through the first diode D1 to the voltage source 201.

A second capacitor C2 is connected to ground and to a second diode D2. The second diode D2 is connected to a node between the first capacitor C1 and the first diode D1 and is also connected to the second capacitor C2. As depicted, the second diode D2 is a schottky diode, but it is contemplated that other types of diodes or diode-like components may also be used. For example, in one embodiment, the second diode D2 may be a zener diode. The second diode D2 allows current to flow to the second capacitor C2 in a first direction and prevents current from flowing through the second diode D2 in a direction opposite to the first direction. Because the inductor L1 and resistor R1 provide a limited current path when the switch Q1 is open, the second diode D2 lower current rated diode D2 may be used for discharging energy from the first capacitor C1 to the second capacitor C2. A third diode D3, a zener diode, is configured in parallel with the second capacitor C2 and acts to limit the voltage across the second capacitor C2 to a voltage higher than the voltage of the voltage source 201.

The switch control module 202 provides a signal to the switch Q1 to control the switch Q1. In one embodiment, the signal is provided with as short of an on duty cycle as reasonably possible. The on period of the signal must be long enough to reliably turn on/close the switch Q1. As noted above, keeping the turn-on-time short with respect the turn-off time minimizes the conduction time to charge the inductor L1 through the resistor R1 between the voltage source 201 and ground. The time constant of the inductor L1 and resistor R1, the time constant of elements associated with the switch control module 202, and the switching characteristics of the switch Q1 each affect the minimum allowable duty cycle of the switch control signal.

In a typical embodiment, the on-time of the duty cycle may correspond to about three time constants of the inductor L1 and resistor R1. In the example used above where the inductor L1 is 100 uH and the resistor R1 is 200 ohms, the time constant is about 0.5 uS. In a circuit with these design constraints, an on-time of about 4 uS and an off-time of about 36 uS is near ideal where the first capacitor C1 has a capacitance of 1 uF. It should be noted that when the first capacitor C1 has a 1 uF capacitance, the time constant associated with the first capacitor C1 and the resistor R1 is about 200 uS. Thus, the off-time of the duty cycle of 36 uS is only a fraction of the single time constant associated with discharging energy from the first capacitor C1. Thus, after the initial charge cycle in to the first capacitor C1, it will always carry a voltage, which minimizes stresses in the switch Q1, first diode D1, and first capacitor C1.

In one embodiment, the inductor L1 is sized as small as possible to minimize cost while still providing enough energy to the second capacitor C2 to charge the second capacitor C2 fast enough to meet design parameters. The inductor L1 and resistor R1 may be designed so that current through the inductor L1 reaches steady state during a closed state of the switch Q1 and then delivers an appropriate amount of energy to the second capacitor C2 during the open state of the switch Q1.

When the switch Q1 turns on/closes, the first capacitor C1 is charged through the first diode D1, and the inductor is charged via the first resistor R1. The resistor R1 ensures that current through the inductor L1 does not damage the inductor L1 or the switch Q1 and provides current limit protection should the switch Q1 ever short circuit. The inductor L1 in series with the resistor R1 are in parallel with the first capacitor C1 when the switch Q1 is on (in the closed state). When Q1 is opened, current continues to flow through the inductor L1 and instead of driving the negative terminal of the first capacitor C1 to the DC voltage rail as with conventional charge pumps, the inductor L1 and resistor R1 provide a pull-up path to the DC voltage at the negative terminal of the first capacitor C1. The inductor L1 becomes a source forcing the voltage on the negative terminal of the first capacitor C1 to a level high enough to maintain the current flow that was achieved in the inductor L1 at the end of the charge cycle (when the switch was closed), thereby transferring the energy stored in the inductor L1 and the first capacitor C1 through the second diode D2 to the second capacitor C2. The second capacitor C2 acts as a storage tank for the energy and continues to build as the cycle repeats itself.

Continuing with the working example mentioned above where the DC source voltage is 12 V, the inductor L1 is 100 uH, the resistor R1 is 200 ohms, and the first capacitor C1 is 1 uF, the second capacitor C2 may have a value of about 330 uF. In this case, the second capacitor C2 is charged to almost double the DC source voltage, to about 23 V relatively quickly, in this case about 500 mS. As the switching cycle continues to pump small amounts of energy from the inductor L1 to the second capacitor C2, it can take about 16 additional seconds of operating time to reach about 27 V. However, the voltage across the second capacitor C2 continues to slowly increase until the voltage is limited by some other means such as the zener diode D3. In this case, the zener diode D3 has a breakdown voltage of about 28 V, so the voltage across the second capacitor C2 is limited to about that value.

In one embodiment, the second capacitor C2 provides the energy needed to power the electronic device 102 or a component thereof (e.g. an HDD) after a drop of loss in power to the device. With a conventional charge pump, the maximum voltage on the second capacitor C2 would be slightly less than two times the DC source voltage (e.g. 22.8 V). So the maximum amount of energy storage in the 330 uF capacitor C2 would be about 85.8 mJ ($0.5*330$ uF$*22.8$ V $^2 = 85.8$ mJ). Conversely, using the energy storage apparatus 108 with the same size storage capacitor C2 limited by the zener diode to 27 V, the maximum amount of energy is about 120.3 mJ ($0.5*330$ uF$*27$ V $^2 = 120.3$ mJ). This is about 40 percent more energy to be stored for a given physical space occupied by the second capacitor C2. Because of the square of the voltage in the energy equation, it is more efficient to store the energy at a higher voltage versus increasing the amount of capacitance. The voltage increased 18% from 22.8 V to 27 V in the example, while an equivalent capacitance increase would have required the size of the second capacitor C2 to grow from a 330 uF to a 462 uF, a 40% increase in capacitance. In addition, a relatively few components are required as compared to a multiple stage charge pump, thus decreasing cost when compared to a conventional charge pump.

Allowing the voltage to go higher allows more energy to be stored without exceeding the voltage rating of the second capacitor C2. Thus, proper selection of the zener diode D3 allows a maximum amount of energy storage for a particular sized capacitor as long as the intended usage of the energy allows for enough time to reach the specified voltage value.

Figure 4:
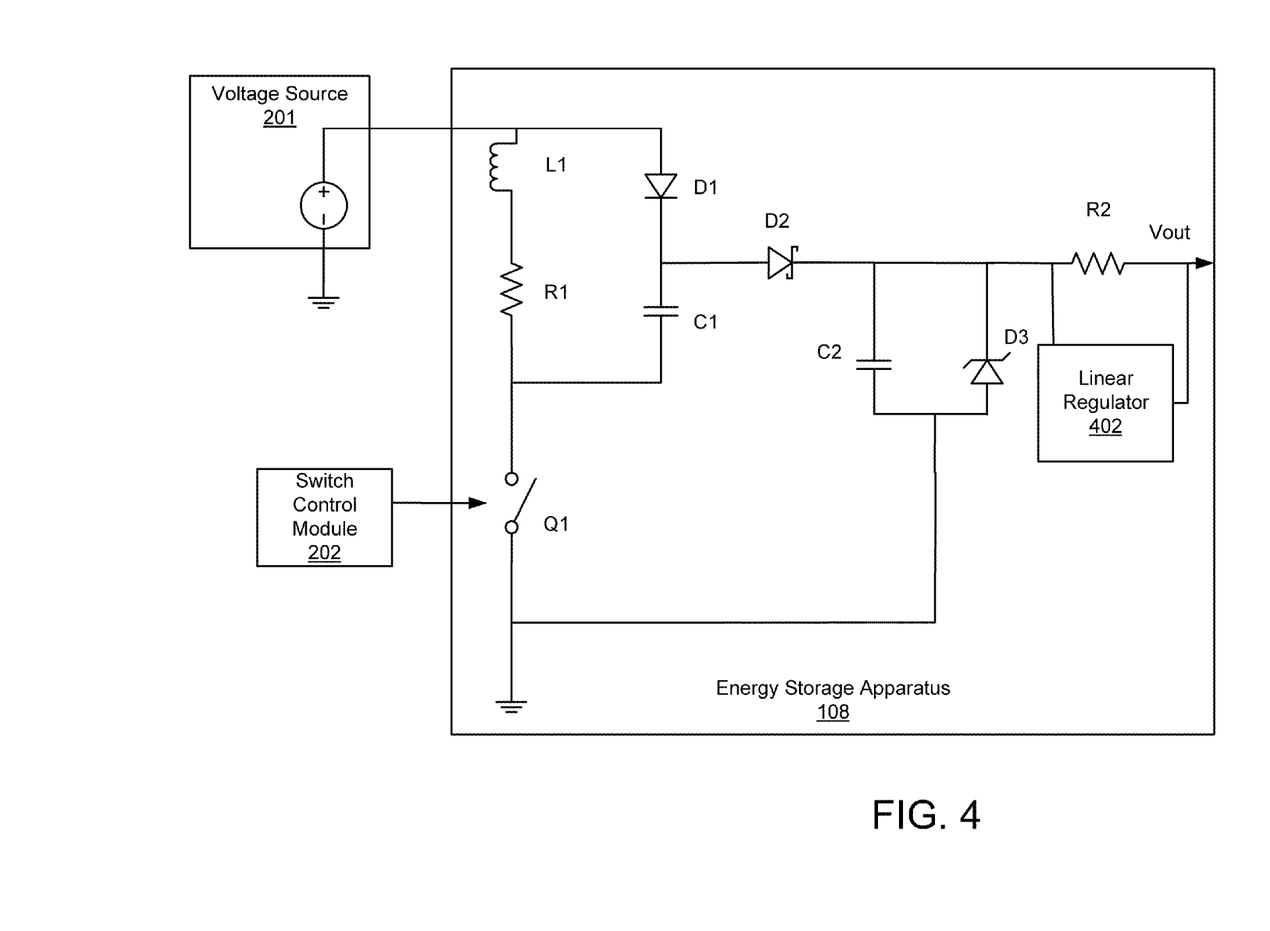
FIG. 4 is a schematic block diagram illustrating another embodiment of an apparatus for storing energy in accordance with the present invention.

FIG. 4 is a schematic block diagram illustrating another embodiment of an apparatus 108 for storing energy in accordance with the present invention. FIG. 4 is the same as FIG. 3 except that it includes a bleed resistor R2 and shows a linear regulator 402.

The bleed resistor R2 can be used similarly to or in addition to the zener diode D3 to limit the voltage across the second capacitor C2. The bleed resistor R2 allows sufficient current to flow from the second capacitor C2 to a load to "bleed" enough charge from the second capacitor C2 so that a predefined maximum voltage is maintained across the second capacitor C2 in the event of a failure of the zener diode D3. If the bleed resistor R2 is configured between the second capacitor C2 and a load 106, then as the voltage across the second capacitor C2 increases, the bleed current through the bleed resistor R2 also increases until it equals the energy that the inductor L1 is able to transfer into the second capacitor C2. This will hold the voltage of the second capacitor C2 at an equilibrium voltage that is typically low enough to prevent the voltage rating of the second capacitor C2 from being exceeded.

The linear regulator 402 regulates a voltage provided to the load 106. For example, the linear regulator 402 may receive an input voltage of about 27 V and regulate the voltage to a smaller voltage of about 12 V. In some cases, the linear regulator 402 may use energy from the second capacitor C2 to provide power to more than one load 106 (e.g. two or more HDDs). The bleed resistor R2 is configured, in one embodiment, to bypass the linear regulator 402 to allow a bleed current to flow to the load 106. Although a linear regulator 402 is depicted, other types of voltage and current regulators may be used in accordance with the present invention.

Figure 5:
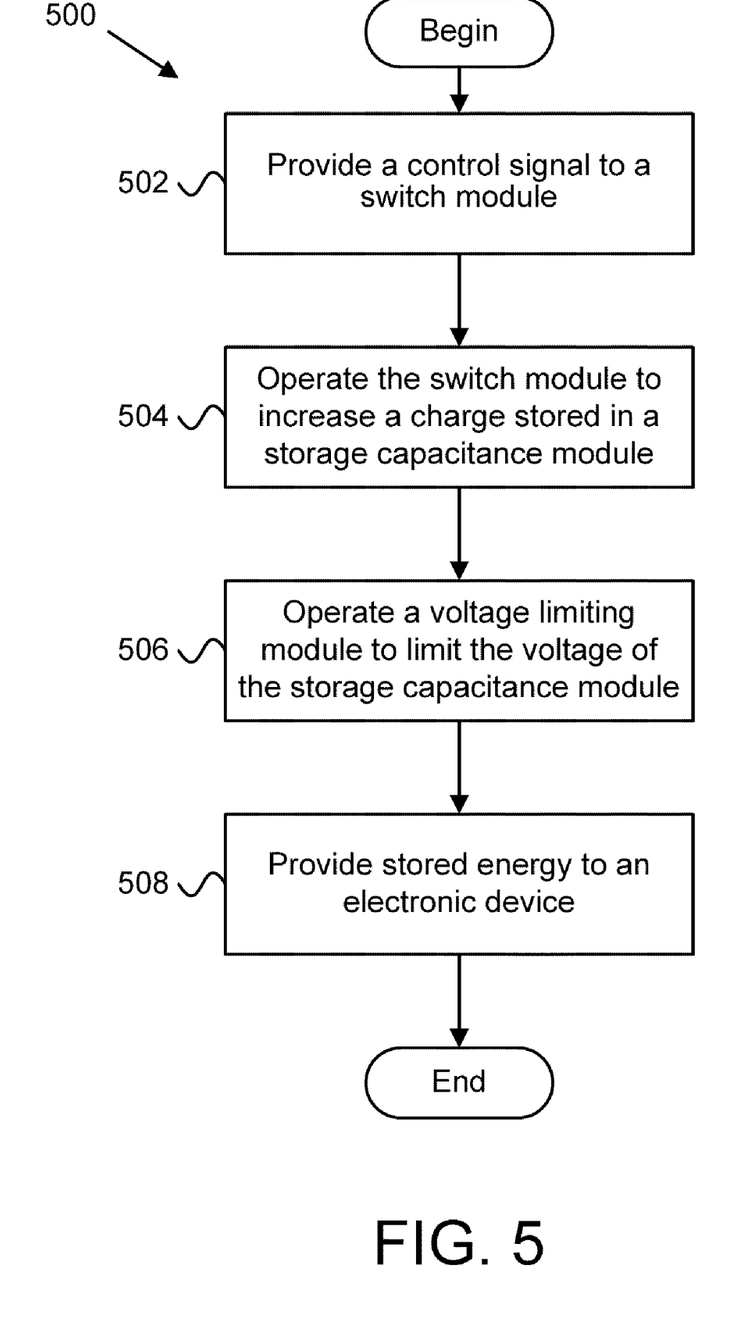
FIG. 5 is a schematic flow chart diagram illustrating one embodiment of a method for storing energy in accordance with the present invention.

FIG. 5 is a schematic flow chart diagram illustrating one embodiment of a method 500 for storing energy in accordance with the present invention. The method in the disclosed embodiments substantially includes the steps necessary to carry out the functions presented above with respect to the operation of the described apparatus and system.

The method 500 begins when the switch control module 202 provides 502 a control signal to a switch module 204 to control the operation of the switch module 204, where the switch module 204 has an open state and a closed state. The switch control module 202 operates 504 the switch module 204 to increase a charge stored in a storage capacitance module 208.

The voltage across the storage capacitance module 208 is increased until a voltage limiting module is to limits 506 the voltage of the storage capacitance module 208. In one embodiment, this is done by a zener diode D3 in parallel with the storage capacitance module 208 and/or bleed resistor R2 connected to the storage capacitance module 208.

Finally, the second capacitance module 208 provides 508 the stored energy to an electronic device 102 in response to a voltage drop below a predefined threshold in a power supply path to the electronic device 102. In this manner, energy is stored over time and then supplied to the electronic device 102 as needed.

The energy storage apparatus 108 gives up some of the speed of a conventional charge pump in exchange for a controlled reduced stress on components, the use of smaller and cheaper components, and allows the voltage achieved to be greater than two times the Dc source voltage. The hybrid design allows a fast initial charge to just under two times the source voltage followed by a slower charge to an elevated voltage, controlled by component selection, to achieve higher energy storage in smaller components.

Figure 6:
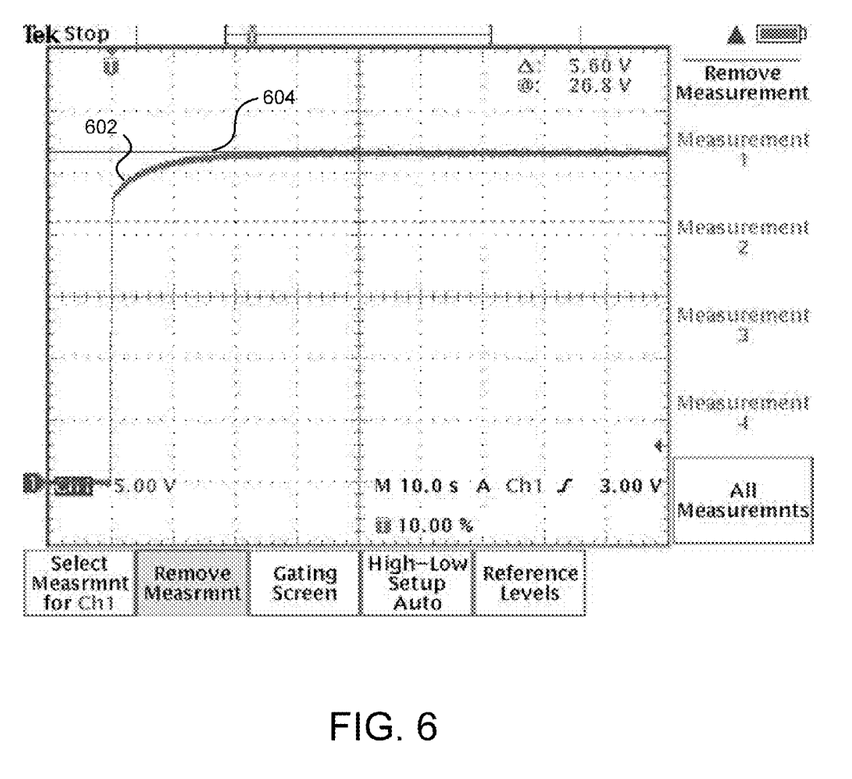
FIG. 6 is a graph depicting the charge characteristics of an energy storing apparatus in accordance with the present invention.

FIG. 6 is a graph depicting the charge characteristics of an energy storing apparatus in accordance with the present invention. The graph shows the voltage across the second capacitor C2 over time. As depicted, the voltage 602 very quickly reaches about 23 V in only about 500 mS. After a much longer period of time, the voltage grows 604 to approach 27 V. In this example, the maximum voltage (defined by the zener diode D3 breakdown voltage) is reached in about sixteen seconds. The graph demonstrates the energy storage apparatus 108 provides a very quick initial charge to almost double the source voltage, and then provides a relatively slow charge that ramps that voltage up until a desired voltage is reached. The second capacitor C2 may be sized to provide a certain amount of holdup time when charged to the zener diode D3 breakdown voltage. Based on this capacitance and a selected switching period, the first capacitor C1, inductor L1, and resistor R1 may be sized to reach the zener diode D3 breakdown voltage in a certain amount of time to meet design criteria while being sized as small as possible to reduce cost.

Embodiments of the present invention may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to store energy, the apparatus comprising:
a switch module connected to ground, the switch module comprising an open state and a closed state;
an inductance module connected between a direct current ("DC") voltage source and a the switch module;
a first capacitance module connected to the switch module and to the inductance module;
a first current blocking module connected between the DC voltage source and the first capacitance module, wherein the first current module allows current to flow from the DC voltage source toward the first capacitance module and prevents current from flowing through the first current blocking module to the DC voltage source;
a second capacitance module connected to ground;
a second current blocking module connected to a node between the first capacitance module and the first current blocking module, and connected to the second capacitance module, wherein the second current blocking module allows current to flow to the second capacitance module in a first direction and prevents current from flowing through the second current blocking module in a direction opposite to the first direction;
a voltage limiting module that limits voltage across the second capacitance module to a predefined limiting voltage that is higher than a voltage of the DC voltage source;
wherein when the switch module is in the closed state, current flows through the inductance module in a direction from the DC voltage source toward the switching module, and wherein current flows through the first current blocking module to store energy in the first capacitance module; and
wherein when the switch module is in the open state, current in the inductance module flows to the first capacitance module, and from the first capacitance module through the second current blocking module to the second capacitance module.

2. The apparatus of claim 1, wherein operating the switch module according to a predefined duty cycle charges the second capacitance module to the predefined limiting voltage.

3. The apparatus of claim 2, wherein operating the switch module according to a predefined duty cycle causes a voltage across the second capacitance module that is greater than two times the DC source voltage.

4. The apparatus of claim 2, wherein a duty cycle comprises an off time that is greater than six times an on-time of the duty cycle.

5. The apparatus of claim 2, wherein an off time of a duty cycle of the pulse-width modulated signal is less than a single time constant associated with the first capacitance module such that after an initial charge cycle, a voltage is maintained across the first capacitance module.

6. The apparatus of claim 1, further comprising a switch control module that provides a pulse-width modulated signal to the switch module, the switch module alternating between the open state and the closed state in response to the pulse-width modulated signal.

7. The apparatus of claim 1, wherein energy stored in the second capacitance module is provided to an electronic device in response to a voltage drop below a predefined threshold in a power supply path to the electronic device.

8. The apparatus of claim 1, wherein the switch module comprises a first switch, the first switch comprising a transistor.

9. The apparatus of claim 1, wherein the inductance module comprises a first inductor.

10. The apparatus of claim 9, wherein the inductance module further comprises a first resistor configured in series with the first inductor.

11. The apparatus of claim 1, wherein the first capacitance module comprises a first capacitor and wherein the second capacitance module comprises a second capacitor.

12. The apparatus of claim 1, wherein the first current blocking module comprises one of a diode, a transistor configured as a diode, and a switch, and wherein the second current blocking module comprises one of a diode, a transistor configured as a diode, and a switch.

13. The apparatus of claim 1, wherein the voltage limiting module comprises a zener diode in parallel with the second capacitance module, the zener diode having a breakdown voltage that corresponds to the predefined maximum voltage across the second capacitance module.

14. The apparatus of claim 1, wherein the voltage limiting module comprises a bleed resistor, the bleed resistor configured to allow sufficient current to flow from the second capacitance module to bleed charge from the second capacitance module to maintain a voltage across the second capacitance module below a predefined maximum voltage.

15. The apparatus of claim 1, wherein the voltage limiting module comprises a zener diode in parallel with the second capacitance module, the zener diode having a breakdown voltage that corresponds to the predefined maximum voltage across the second capacitance module, the voltage limiting module further comprising a bleed resistor, the bleed resistor configured to allow sufficient current to flow from the second capacitance module to bleed charge from the second capacitance module to maintain a voltage across the second capacitance module below a predefined maximum voltage.

16. A system to store energy, the apparatus comprising:
a power supply configured to provide power to one or more electronic devices;
an energy storage apparatus coupled to the power supply, the energy storage apparatus comprising:
a switch module connected to ground, the switch module comprising an open state and a closed state;
an inductance module connected between a direct current ("DC") voltage source and a the switch module;
a first capacitance module connected to the switch module and to the inductance module;
a first current blocking module connected between the DC voltage source and the first capacitance module, wherein the first current module allows current to flow from the DC voltage source toward the first capacitance module and prevents current from flowing through the first current blocking module to the DC voltage source;
a second capacitance module connected to ground;
a second current blocking module connected to a node between the first capacitance module and the first current blocking module, and connected to the second capacitance module, wherein the second current blocking module allows current to flow to the second capacitance module in a first direction and prevents current from flowing through the second current blocking module in a direction opposite to the first direction;

a voltage limiting module that limits voltage across the second capacitance module to a voltage higher than a voltage of the DC voltage source;

wherein when the switch module is in the closed state, current flows through the inductance module in a direction from the DC voltage source toward the switching module, and wherein current flows through the first current blocking module to store energy in the first capacitance module; and wherein when the switch module is in the open state, current in the inductance module flows to the first capacitance module, and from the first capacitance module through the second current blocking module to the second capacitance module.

17. The system of claim 16, further comprising an electronic device coupled to the power supply and energy storage apparatus, the energy storage apparatus configured to provide stored energy to the electronic device.

18. The system of claim 17, wherein the electronic device comprises one of a personal computer, laptop, personal digital assistant, server, and cellular telephone.

19. An apparatus to store energy, the apparatus comprising:
a switch connected to ground, the switch comprising an open state and a closed state;
an inductor and a resistor connected in series between a direct current ("DC") voltage source and a the switch;
a first capacitor connected to the switch;
a first diode connected between the DC voltage source and the first capacitor such that the first diode and first capacitor are in series, wherein the first diode allows current to flow from the DC voltage source toward the first capacitor and prevents current from flowing through the first diode to the DC voltage source;
a second capacitor connected to ground;
a second diode connected to a node between the first capacitor and the first diode and to the second capacitor, wherein the second diode allows current to flow to the second capacitor in a first direction and prevents current from flowing through the second diode in a direction opposite to the first direction;
a zener diode configured in parallel with the second capacitor that limits voltage across the second capacitor to a voltage higher than a voltage of the DC voltage source;
wherein when the switch is in the closed state, current flows through the inductor in a direction from the DC voltage source toward the switch, and current flows through the first diode to store energy in the first capacitor; and
wherein when the switch module is in the open state, current in the inductor flows to the first capacitor, and from the first capacitor through the second diode to the second capacitor.

20. The apparatus of claim 1, wherein operating the switch according to a predefined duty cycle charges the second capacitance module to the predefined limiting voltage.

* * * * *